(12) United States Patent
Bestle et al.

(10) Patent No.: US 8,839,154 B2
(45) Date of Patent: Sep. 16, 2014

(54) ENHANCED ZOOMING FUNCTIONALITY

(75) Inventors: Nikolaj Heiberg Bestle, Copenhagen (DK); Christian Rossing Kraft, Frederiksberg (DK)

(73) Assignee: Nokia Corporation, Espoo (FI)

( * ) Notice: Subject to any disclaimer, the term of this patent is extended or adjusted under 35 U.S.C. 154(b) by 967 days.

(21) Appl. No.: 12/347,011

(22) Filed: Dec. 31, 2008

(65) Prior Publication Data

US 2010/0169819 A1 Jul. 1, 2010

(51) Int. Cl.
*G06F 3/00* (2006.01)
*G06F 3/0488* (2013.01)

(52) U.S. Cl.
CPC .. *G06F 3/04883* (2013.01); *G06F 2203/04806* (2013.01); *G06F 2203/04808* (2013.01)
USPC .......................................................... 715/863

(58) Field of Classification Search
USPC .................................................. 715/788, 863
See application file for complete search history.

(56) References Cited

U.S. PATENT DOCUMENTS

| | | | |
|---|---|---|---|
| 6,037,937 A | 3/2000 | Beaton et al. | |
| 6,121,960 A * | 9/2000 | Carroll et al. | 345/173 |
| 6,396,523 B1 | 5/2002 | Segal et al. | |
| 7,515,135 B2 * | 4/2009 | Varanda | 345/156 |
| 7,653,883 B2 | 1/2010 | Hotelling et al. | |
| 7,705,833 B2 | 4/2010 | Kim | |
| 2003/0025676 A1 | 2/2003 | Cappendijk | |
| 2004/0070569 A1 | 4/2004 | Muthuswamy et al. | |
| 2005/0134578 A1 | 6/2005 | Chambers et al. | |
| 2005/0162402 A1 | 7/2005 | Watanachote | |
| 2006/0026521 A1 * | 2/2006 | Hotelling et al. | 715/702 |
| 2006/0101354 A1 * | 5/2006 | Hashimoto et al. | 715/863 |
| 2006/0242607 A1 | 10/2006 | Hudson | |
| 2006/0253793 A1 | 11/2006 | Zhai et al. | |
| 2006/0255971 A1 * | 11/2006 | Kim | 341/34 |
| 2007/0146339 A1 | 6/2007 | Yang et al. | |
| 2007/0226646 A1 * | 9/2007 | Nagiyama et al. | 715/784 |
| 2007/0252821 A1 * | 11/2007 | Hollemans et al. | 345/173 |
| 2007/0252822 A1 | 11/2007 | Kim et al. | |
| 2008/0005701 A1 | 1/2008 | Park et al. | |
| 2008/0048910 A1 * | 2/2008 | Wang et al. | 342/357.15 |
| 2008/0158191 A1 * | 7/2008 | Yang et al. | 345/173 |
| 2008/0168379 A1 | 7/2008 | Forstall et al. | |
| 2008/0270896 A1 | 10/2008 | Kristensson | |

(Continued)

FOREIGN PATENT DOCUMENTS

EP 1 197 835 A2 4/2002
EP 1 555 601 A2 7/2005

(Continued)

OTHER PUBLICATIONS

Kahney, Leander, "Hoping Apple's 'Brick' is First All-Screen Laptop," Sep. 28, 2008, <http://www.cultofmac.com/hoping-apples-brick-is-first-all-screen-laptop/3230>.

(Continued)

*Primary Examiner* — Ryan Pitaro
(74) *Attorney, Agent, or Firm* — Alston & Bird LLP

(57) ABSTRACT

A method includes detecting an image presented on a display area of a device; detecting a pointing device input on a touch sensitive area of a device; determining that the input includes at least one point of contact on the touch sensitive area; and activating a zoom functionality of the device.

20 Claims, 13 Drawing Sheets

(56) References Cited

U.S. PATENT DOCUMENTS

| | | | |
|---|---|---|---|
| 2009/0027421 A1* | 1/2009 | Servan-Schreiber et al. | 345/661 |
| 2009/0102818 A1* | 4/2009 | Xu et al. | 345/184 |
| 2009/0228820 A1* | 9/2009 | Kim et al. | 715/769 |
| 2009/0278974 A1* | 11/2009 | Kuwahara et al. | 348/333.06 |
| 2009/0322699 A1* | 12/2009 | Hansson | 345/174 |
| 2010/0002016 A1* | 1/2010 | Kim | 345/660 |
| 2010/0088596 A1* | 4/2010 | Griffin et al. | 715/702 |
| 2010/0149122 A1* | 6/2010 | Lin | 345/173 |
| 2011/0095983 A1* | 4/2011 | Lu et al. | 345/166 |

FOREIGN PATENT DOCUMENTS

| | | |
|---|---|---|
| EP | 1 599 787 A1 | 11/2005 |
| EP | 1 621 989 A2 | 2/2006 |
| EP | 1 639 439 A2 | 3/2006 |
| EP | 1 969 452 A2 | 9/2008 |
| WO | 98/05025 A1 | 2/1998 |
| WO | 01/13209 A1 | 2/2001 |
| WO | WO 01/42899 A1 | 6/2001 |
| WO | WO 2004/079557 A1 | 9/2004 |
| WO | 2006/015514 A1 | 2/2006 |
| WO | 2008/133619 A2 | 11/2008 |

OTHER PUBLICATIONS

Kristensson, Per Ola, et al., "Command Strokes with and Without Preview: Using Pen Gestures on Keyboard for Command Selection," Apr. 28-May 3, 2007. <http://pokristensson.com/pubs/KristenssonZhaiCHI2007a.pdf>.

Farrugia, Maria, "Future User Interfaces for Mobile Devices," May 23-26, 2006. <http://www.research.att.com/~rjana/MobEA-IV/PAPERS/MobEA_IV-Paper_8.pdf>.

Office Action for U.S. Appl. No. 12/347,062 dated Jul. 16, 2012.

European Search Report for Application No. 09179436.2 dated Dec. 16, 2011.

* cited by examiner

ENHANCED ZOOMING FUNCTIONALITY

CROSS-REFERENCE TO RELATED APPLICATIONS

This application is related to U.S. patent application Ser. No. 12/347,062, filed on Dec. 31, 2008, entitled TOUCH-CLICK KEYPAD, the disclosure of which is incorporated herein by reference in its entirety.

BACKGROUND

1. Field

The aspects of the disclosed embodiments generally relate to user interfaces and more particularly to a user interface for a touch screen device.

2. Brief Description of Related Developments

Generally, touch screen devices can accept gestures for shortcuts, scrolling and letter writing. However, navigation of menus and other functions on these types of devices can be difficult because the pointing device, generally the user's finger, will occupy at least a portion of the screen when providing input to the device. This finger blocking can make it hard to see the screen or the functions on the screen during complex navigation on smaller screens. The user will often need to "step back" (remove finger) between sequences in navigation.

Efficient use of touch screen requires generous size of UI elements which is often missed or impossible in small screens. Additionally, an Output UI (Screen) mixed with Input UI elements (buttons) can be confusing for the user if clickable elements do not having an obvious graphic design, i.e. what can I press? In many situations, it is necessary to maintain a separate select key so that an enable menu or function can be accessed.

It would be advantageous to be able to easily access functions on a touch screen device.

SUMMARY

The aspects of the disclosed embodiments are directed to at least a method, apparatus, user interface and computer program product. In one embodiment the method includes detecting an image presented on a display area of a device; detecting a pointing device input on a touch sensitive area of a device; determining that the input includes at least one point of contact on the touch sensitive area; and activating a zoom functionality of the device.

BRIEF DESCRIPTION OF THE DRAWINGS

The foregoing aspects and other features of the embodiments are explained in the following description, taken in connection with the accompanying drawings, wherein.

DETAILED DESCRIPTION OF THE EMBODIMENT(S)

Figure 1:
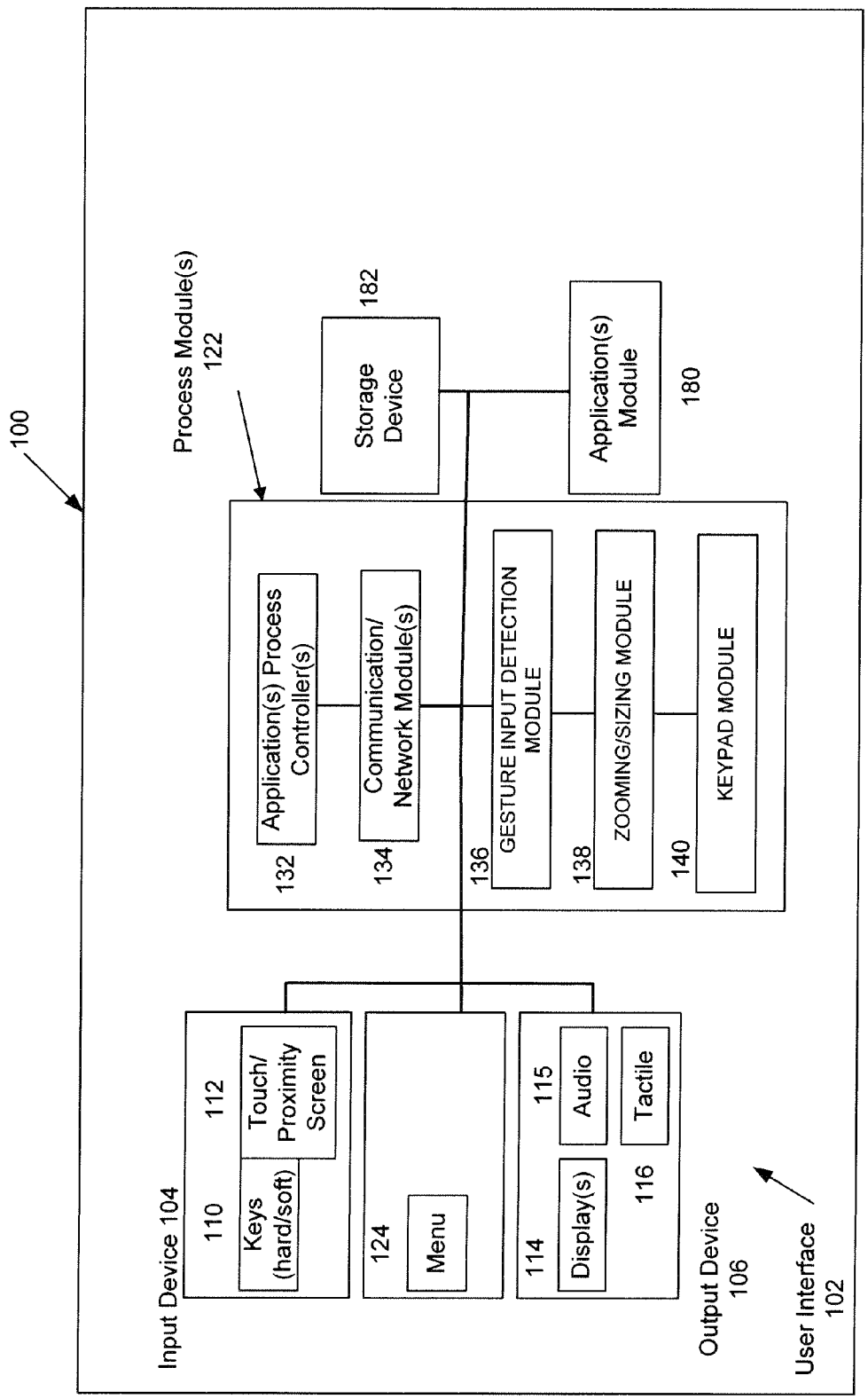
FIG. 1 shows a block diagram of a system in which aspects of the disclosed embodiments may be applied.

FIG. 1 illustrates one embodiment of a system 100 in which aspects of the disclosed embodiments can be applied. Although the disclosed embodiments will be described with reference to the embodiments shown in the drawings and described below, it should be understood that these could be embodied in many alternate forms. In addition, any suitable size, shape or type of elements or materials could be used.

The aspects of the disclosed embodiments generally provide for selecting a function in a mobile terminal through a touch sensitive keypad with the need for a selection key. In one embodiment, the user performs a gesture on a touch sensitive area of a display, such as a swiping motion, to go to a desired function. The desired function can be selected by a tapping on the touch sensitive area. A keypad that normally occupies the touch sensitive area of the display will disappear from sight when the initial gesture is detected, and re-appear when the gesture movement, or series of movements, is completed.

FIG. 1 illustrates one example of a system 100 incorporating aspects of the disclosed embodiments. Generally, the system 100 includes a user interface 102, process modules 122, applications module 180, and storage devices 182. In alternate embodiments, the system 100 can include other suitable systems, devices and components that allow for associating option menus with a title bar and allows for easy and quick identification and selection of the option menus. The components described herein are merely exemplary and are not intended to encompass all components that can be included in the system 100. The system 100 can also include one or more processors or computer program products to execute the processes, methods, sequences, algorithms and instructions described herein.

In one embodiment, the process module 122 includes a gesture input detection module 136, a image zooming/resizing module 138 and a keypad module 140. In alternate embodiments, the process module 122 can include any suitable function and selection modules for use with a touch sensitive display. In one embodiment, the gesture input detection module 136 is generally configured to detect an input to the touch sensitive display and determine a type and/or nature of the input. For example, in one embodiment, inputs to the touch sensitive area can comprise activation of one or more elements of a keypad that is provided by the keypad module. The inputs to the touch sensitive area can also include commands in the form of gestures or swipes. Different types of gestures or swipes can be used to enable and activate different functions of the system 100.

Based upon the detected command, the image zooming/resizing module 138 can be activated. The image zooming module 138 is generally configured to increase or decrease a size and/or resolution of an image that is being presented on a display 114 of the device 100. Depending on the type of gesture input that is detected, the size of the image being presented can be enhanced or reduced in a suitable manner. In one embodiment, the entirety of the image can be enhanced or reduced. In an alternate embodiment, only a portion of the image can be selected and enhanced or reduced. For example, the input detection module 136 can detect an input to activate the zoom functionality with respect to a particular region of the image being presented. The image zooming module 138 is configured to focus only on the selected region for enhancement or reduction, depending upon the detected input.

In one embodiment, the process module 122 also includes a keypad module 140. The keypad module 140 can comprise an ITU keypad module that provides an ITU keypad on the touch sensitive area. In alternate embodiments, any suitable keypad or keypad arrangement can be used. The keypad module 140 is generally configured to provide a keypad in the touch sensitive area of the display. If a gesture movement or input is detected by the gesture input detection module that does not correspond to a keypad input, in one embodiment, the keypad module 140 is configured to deactivate or remove the keypad from the visible portion of the touch sensitive area. The keypad module 140 will not reactivate or represent the keypad on the touch sensitive area until after the detected gesture input(s) are completed.

Figure 2A:
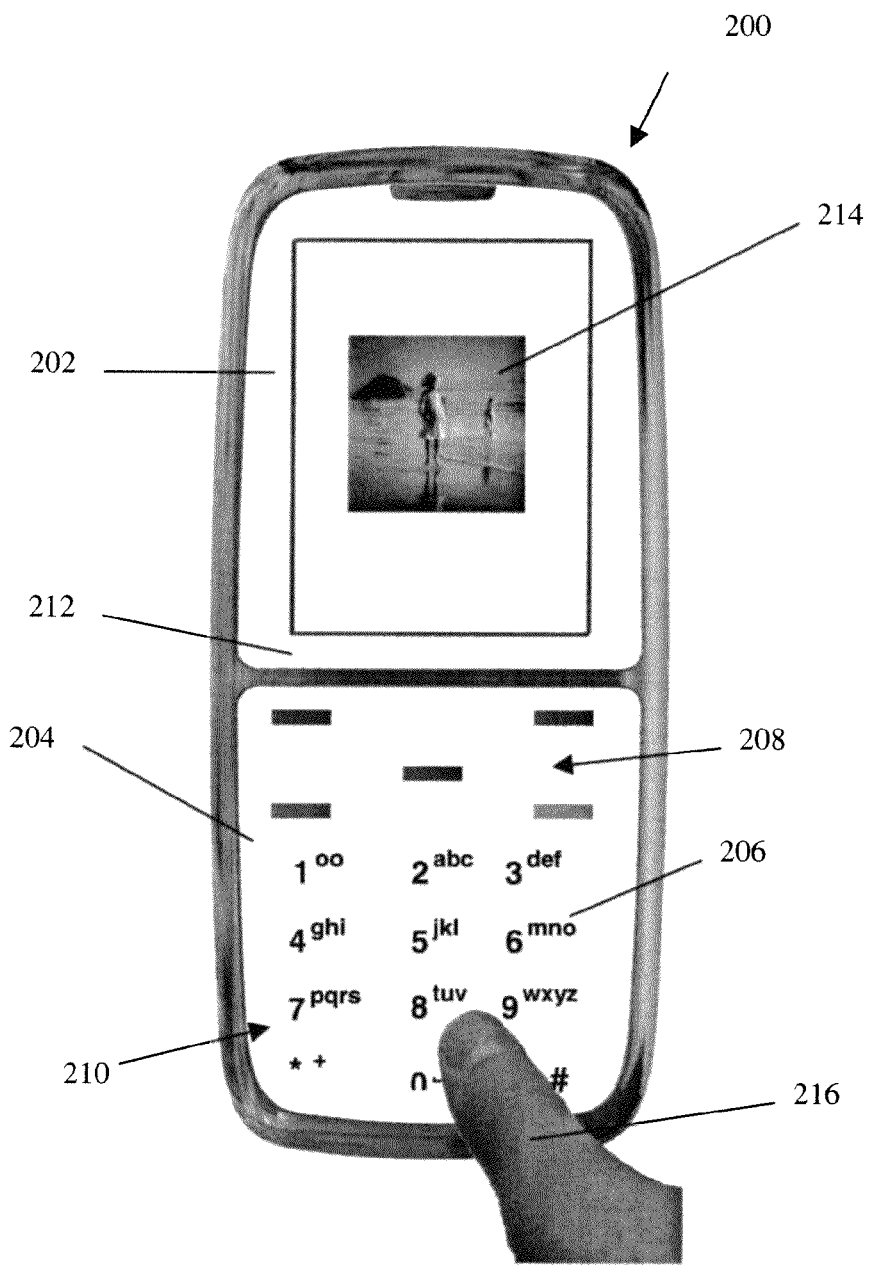
FIGS. 2A-2B illustrate exemplary user interfaces incorporating aspects of the disclosed embodiments.
Figure 2B:
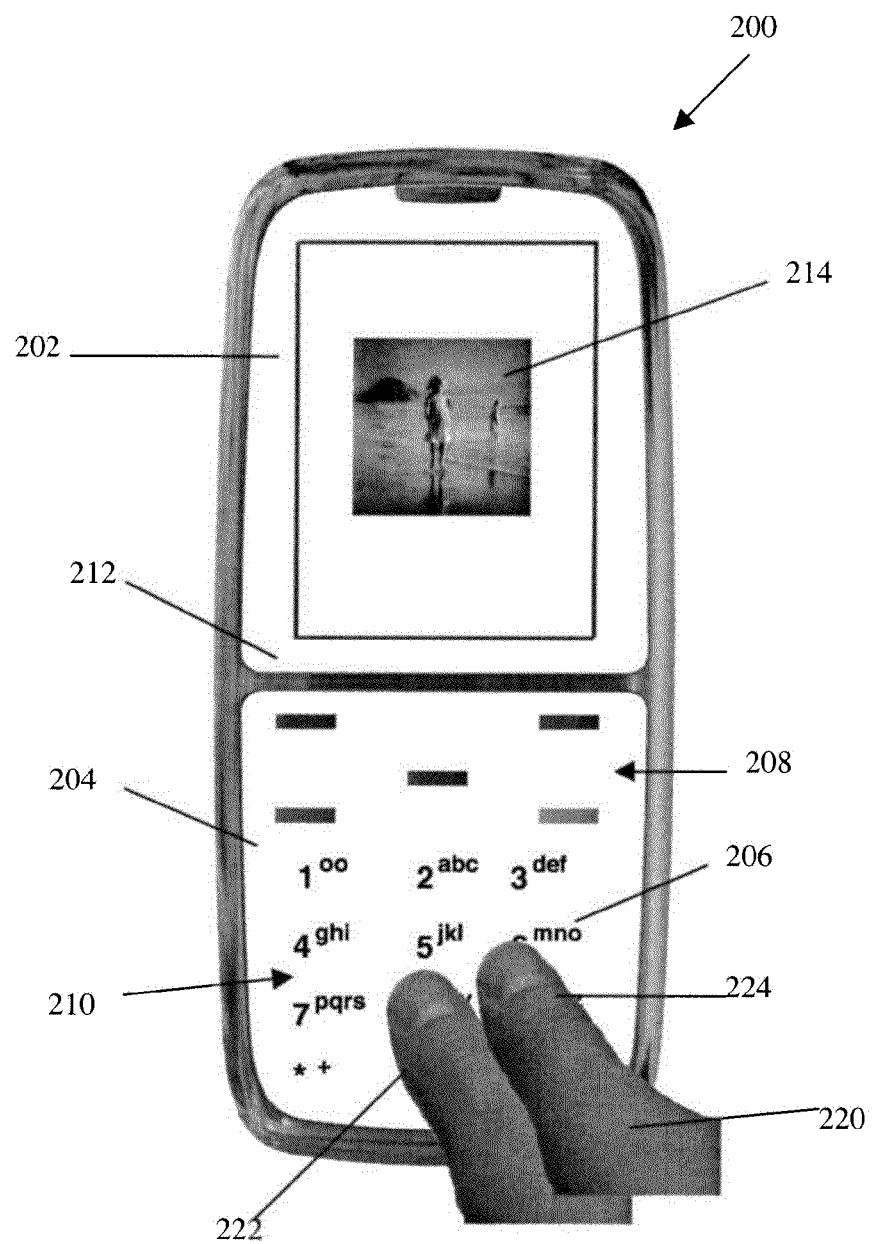

FIGS. 2A-2B illustrate screen shots of exemplary user interfaces incorporating aspects of the disclosed embodiments. As shown in FIG. 2A, the device 200 includes a display area 202 and a touch sensitive area 204. In one embodiment, the touch sensitive area 204 includes a keypad 206 and navigation soft keys 208. As is generally understood, activation of any one of the keys 210 of the keypad 206 will activate the corresponding function, such as generating the corresponding number. The display area 202 can also include a function area 212 that presents functions that are available to be selected and activated in conjunction with the navigation keys 208, as is generally understood.

As shown in FIG. 2A, image 214 is presented on the display 202 in a suitable manner. The image 214 can be any suitable image that can be presented on a display and the aspects of the disclosed embodiments are not so limited. In some cases, it is desirable to enlarge or reduce a size or resolution of the image 214, or a portion thereof. Generally, this will be referred to herein as activating and using a "zoom" function. As will be generally understood, one can "zoom in" or "zoom out", which will make the image bigger or smaller. Other alternate terms of art are equally applicable, such as for example, magnify, expand, shrink, increase resolution or decrease resolution.

Referring to FIG. 2A, when an image 214 is on the display 202, the zoom function can be activated by detecting a touch or contact of a pointing device 216 on the touch sensitive area 204. In the example shown in FIG. 2A, the pointing device 216 comprises the user's finger(s). In alternate embodiments, any suitable pointing device can be used. In one embodiment, a short press on the touch sensitive area 204, when image 214 is being presented or active, can activate the zoom function. In alternate embodiments, the activation of the zoom function can be caused by any suitable touch or contact with the touch sensitive area 204, other than including a short press. For example, in one embodiment, the activation gesture can comprise a press of a pre-determined duration, which in turn activates the zoom function. Other exemplary gestures can include for example, a "click and swipe" action, tap or double tap, can be used to activate the zooming function and zoom. In one embodiment, continued contact with the touch sensitive area 204 keeps the zoom function active and corresponding gesture movements are used to control the zoom functions. When the pointer 216 is released from substantial contact with the touch sensitive display 204, for a pre-determined period of time, the zoom function is closed or deactivated. As noted herein, in one embodiment, when the zoom function is activated, the keypad 206 can removed from the view of the touch-sensitive display area 204. The touch sensitive area 204 can remain blank or dark, or a suitable image can be displayed. For example, an image corresponding to the zoom function can be displayed to notify the user of the activation of the function. In an alternative embodiment, an image(s) or icon(s) can be presented that correspond to the available commands and/or functions available in the zoom mode, and inform the user of the input required for a particular function, such as select, expand or reduce.

In one embodiment, the user can be informed that the zooming function is active by a notification. Any suitable notification can be used, such as for example, an audible or visual notification. For example, a corresponding icon or text may appear on the screen momentarily, for a pre-determined period of time, or for the duration the zooming function is active. If the notification is audible, the notification can comprise a "beep" or "click", or such other suitable sound(s).

Once the zooming function is function is active, movement or contact of the pointing device 216 on or about the touch sensitive area 204 will either increase or decrease a size or resolution of the image 214 on the display 202. For example, movement of the pointing device 216 in one direction can enlarge a size of the image 214, while movement is an opposite direction can reduce a size of the image 214. In one embodiment, movement of the pointing device 216 in a substantially upward direction can enlarge the size of the image 214, while movement in a substantially downward direction can reduce the size of the image 214. In alternate embodiments, any suitable movement or gesture can be used to change the size of the image 214. For example, circular gestures, horizontal gestures, diagonal gestures, or other such suitable gestures can be used, where movement in one direction cause one action and movement in the opposite direction causes another action. Other exemplary zoom function controls can include taps on the touch sensitive area 204. For example, a single tap can be used to control a "zoom-in", while a double tap can cause a "zoom-out", or vice versa. As noted above, in one embodiment, suitable images can be provided on the touch sensitive area 204 to provide the user with guidance as to the type of input required.

As another example, referring to FIG. 2B, when the pointing device 220 includes two points of contact 222, 224, movement and/or positioning of one or both points of contact can be used to provide the inputs for controlling the zoom functions. Here, two fingers are used as the pointing device. For example, holding one contact stationary and moving the other contact can effect zooming. Although in this example, two fingers are shown making contact with the touch sensitive area 204, in alternate embodiments one or more than two fingers can be used. The zoom function is activated by the two fingers 222, 224 making contact with the touch sensitive area 204. Holding finger 222 substantially stationary while swiping finger 224 away from finger 222 can cause the size of image 214 to enlarge, while moving the finger 224 back towards finger 222 can cause the size of image 214 to contract. Alternatively, after the zoom function is activated, movement of finger 222 while finger 224 is held substantially stationary can cause the size of image 214 to be contracted or enlarged.

Figure 3:
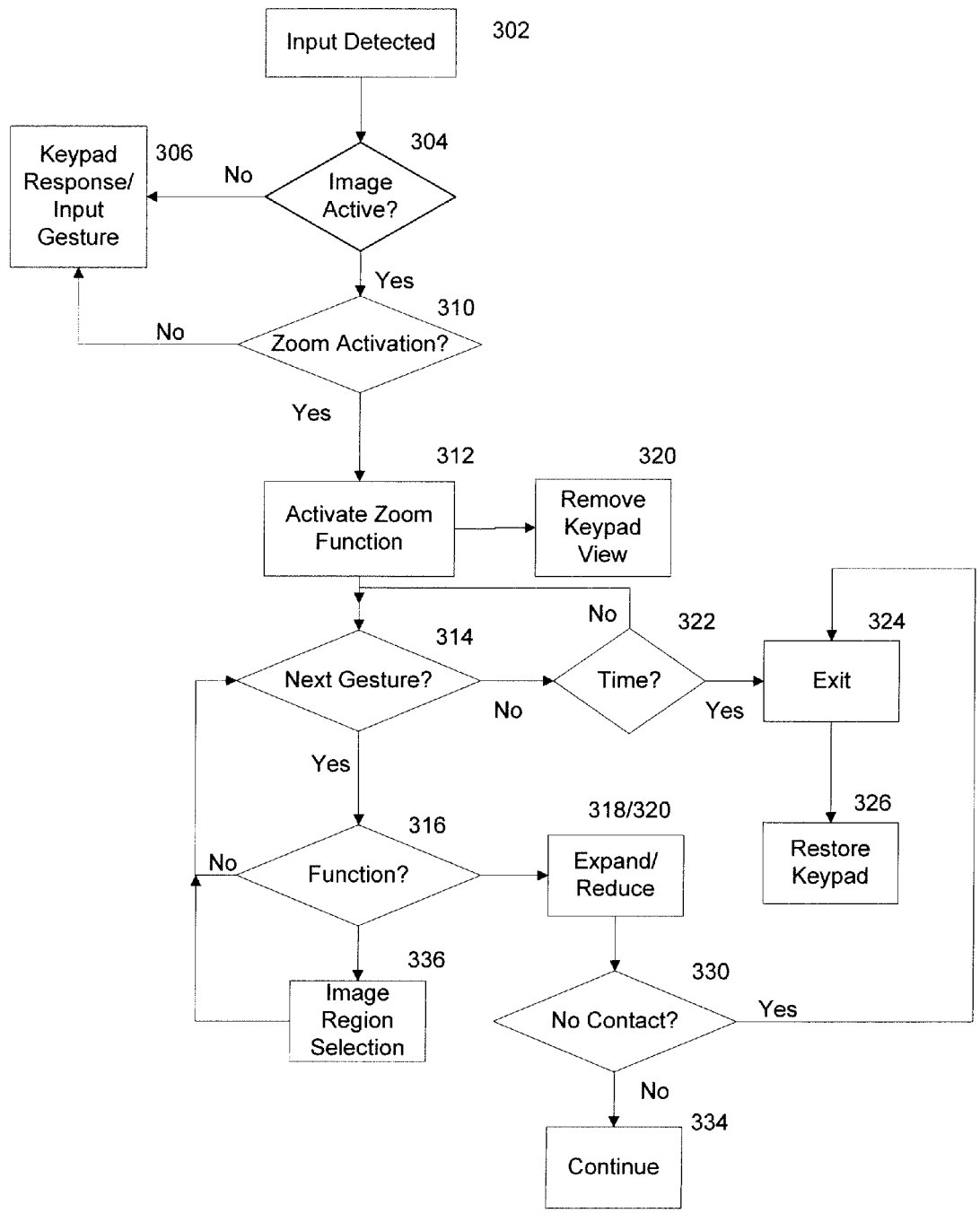
FIG. 3 is illustrates an exemplary process including aspects of the disclosed embodiments.

FIG. 3 illustrates an exemplary process incorporating aspects of the disclosed embodiments. In a first aspect, a gesture is detected 302 on a touch sensitive area of a display. It is determined 304 whether an image is active on a display of device. If no image is present, in one embodiment, the gesture is categorized as a keypad input or other selection input gesture 306, as described in co-pending U.S. patent application Ser. No. 12/347,062. If yes, it is determined 310 whether the gesture is a zoom function activation input gesture. If no, and the gesture is not a zoom function activation input, in one embodiment, the gesture is categorized as a keypad input or other selection input gesture 306, as described in co-pending U.S. patent application Ser. No. 12/347,062. If the gesture is determined to be a zoom function activation input, the zoom function is activated or opened 312.

Once the zoom function is active, it is determined 314 whether a subsequent gesture input is detected. If yes, it is determined 316 whether the input corresponds to an expand 318 or reduce 320 zoom function and the corresponding functionality is activated. In one embodiment, the input can comprise a command 336 to select a point on the image, where the selected point is the center of the focus of the expansion/reduction. In this embodiment, the subsequent gesture can include a contact on the image or use of the navigation keys to select a focus point. If no subsequent gesture input is detected, in one embodiment, it is determined 322 whether a pre-determined time period has expired. If no, it is again determined 314 whether a subsequent gesture input is detected. If the pre-determined time period has expired, in one embodiment the zoom function exits 324. In an alternate embodiment, the user can be prompted for an input or exit command.

In one embodiment, if at any point after the zoom function is activated 312, it is determined 330 that the pointing device is no longer in substantial contact with the touch sensitive area, the zoom function can automatically exit or close 324. Otherwise, the process continues 334.

In one embodiment, when the zoom function is activated 312, the keypad view and functionality is removed 320 from the touch sensitive area. When the zoom function exits or closes 324, the keypad view and functionality can be restored.

Referring to FIG. 1, the input device(s) 104 are generally configured to allow a user to input data, instructions, gestures and commands to the system 100. In one embodiment, the input device 104 can be configured to receive input commands remotely or from another device that is not local to the system 100. The input device 104 can include devices such as, for example, keys 110, touch sensitive area or screen 112 and menu 124. The input devices 104 could also include a camera device (not shown) or other such other image capturing system. In alternate embodiments the input device can comprise any suitable device(s) or means that allows or provides for the input and capture of data, information and/or instructions to a device, as described herein.

The output device(s) 106 are configured to allow information and data to be presented to the user via the user interface 102 of the system 100 and can include one or more devices such as, for example, a display 114, audio device 115 or tactile output device 116. In one embodiment, the output device 106 can be configured to transmit output information to another device, which can be remote from the system 100. While the input device 104 and output device 106 are shown as separate devices, in one embodiment, the input device 104 and output device 106 can be combined into a single device, and be part of and form, the user interface 102. For example, the touch sensitive area 204 of FIG. 2 can also be used to present information in the form of the keypad elements of keypad 206. While certain devices are shown in FIG. 1, the scope of the disclosed embodiments is not limited by any one or more of these devices, and an exemplary embodiment can include, or exclude, one or more devices.

The process module 122 is generally configured to execute the processes and methods of the disclosed embodiments. The application process controller 132 can be configured to interface with the applications module 180, for example, and execute applications processes with respects to the other modules of the system 100. In one embodiment the applications module 180 is configured to interface with applications that are stored either locally to or remote from the system 100 and/or web-based applications. The applications module 180 can include any one of a variety of applications that may be installed, configured or accessible by the system 100, such as for example, office, business, media players and multimedia applications, web browsers and maps. In alternate embodiments, the applications module 180 can include any suitable application. The communication module 134 shown in FIG. 1 is generally configured to allow the device to receive and send communications and messages, such as text messages, chat messages, multimedia messages, video and email, for example. The communications module 134 is also configured to receive information, data and communications from other devices and systems or networks, such as for example, the Internet. In one embodiment, the communications module 134 is configured to interface with, and establish communications connections with the Internet.

In one embodiment, the applications module 180 can also include a voice recognition system that includes a text-to-speech module that allows the user to receive and input voice commands, prompts and instructions, through a suitable audio input device.

The user interface 102 of FIG. 1 can also include menu systems 124 coupled to the processing module 122 for allowing user input and commands and enabling application functionality. The processing module 122 provides for the control of certain processes of the system 100 including, but not limited to the controls for detecting and determining gesture inputs and commands. The menu system 124 can provide for the selection of different tools and application options related to the applications or programs running on the system 100 in accordance with the disclosed embodiments. In the embodiments disclosed herein, the process module 122 receives certain inputs, such as for example, signals, transmissions, instructions or commands related to the functions of the system 100. Depending on the inputs, the process module 122 interprets the commands and directs the process control 132 to execute the commands accordingly in conjunction with the other modules.

Figure 4A:
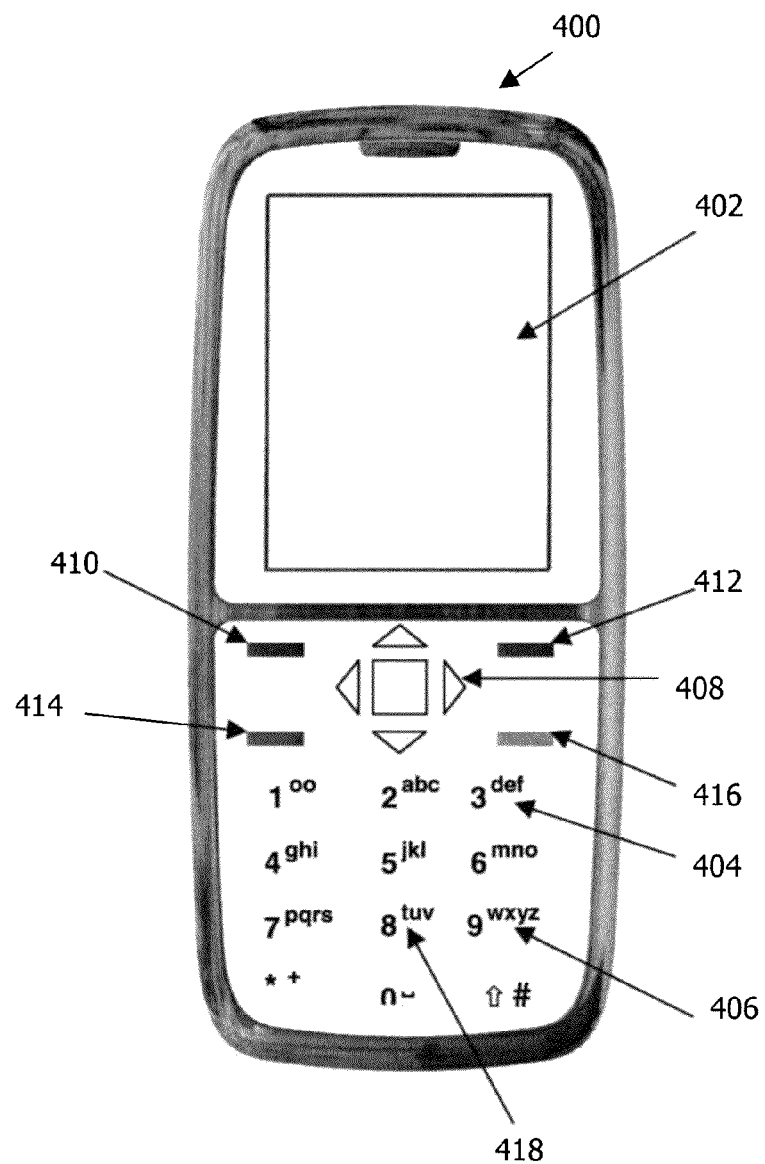
FIG. 4A-4B are illustrations of exemplary devices that can be used to practice aspects of the disclosed embodiments.

Referring to FIGS. 1 and 4A, in one embodiment, the user interface of the disclosed embodiments can be implemented on or in a device that includes a touch sensitive area, touch screen display, proximity screen device or other graphical user interface.

In one embodiment, the display 114 is integral to the system 100. In alternate embodiments the display may be a peripheral display connected or coupled to the system 100. A pointing device, such as for example, a stylus, pen or simply the user's finger may be used with the display 114. In alternate embodiments any suitable pointing device may be used. In other alternate embodiments, the display may be any suitable display, such as for example a flat display 114 that is typically made of a liquid crystal display (LCD) with optional back lighting, such as a thin film transistor (TFT) matrix capable of displaying color images.

The terms "select" and "touch" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information. Thus, the above noted terms are intended to include that a user only needs to be within the proximity of the device to carry out the desired function.

Similarly, the scope of the intended devices is not limited to single touch or contact devices. Multi-touch devices, where contact by one or more fingers or other pointing devices can navigate on and about the screen, are also intended to be encompassed by the disclosed embodiments. Non-touch devices are also intended to be encompassed by the disclosed embodiments. Non-touch devices include, but are not limited to, devices without touch or proximity screens, where navigation on the display and menus of the various applications is performed through, for example, keys 110 of the system or through voice commands via voice recognition features of the system.

Figure 7A:
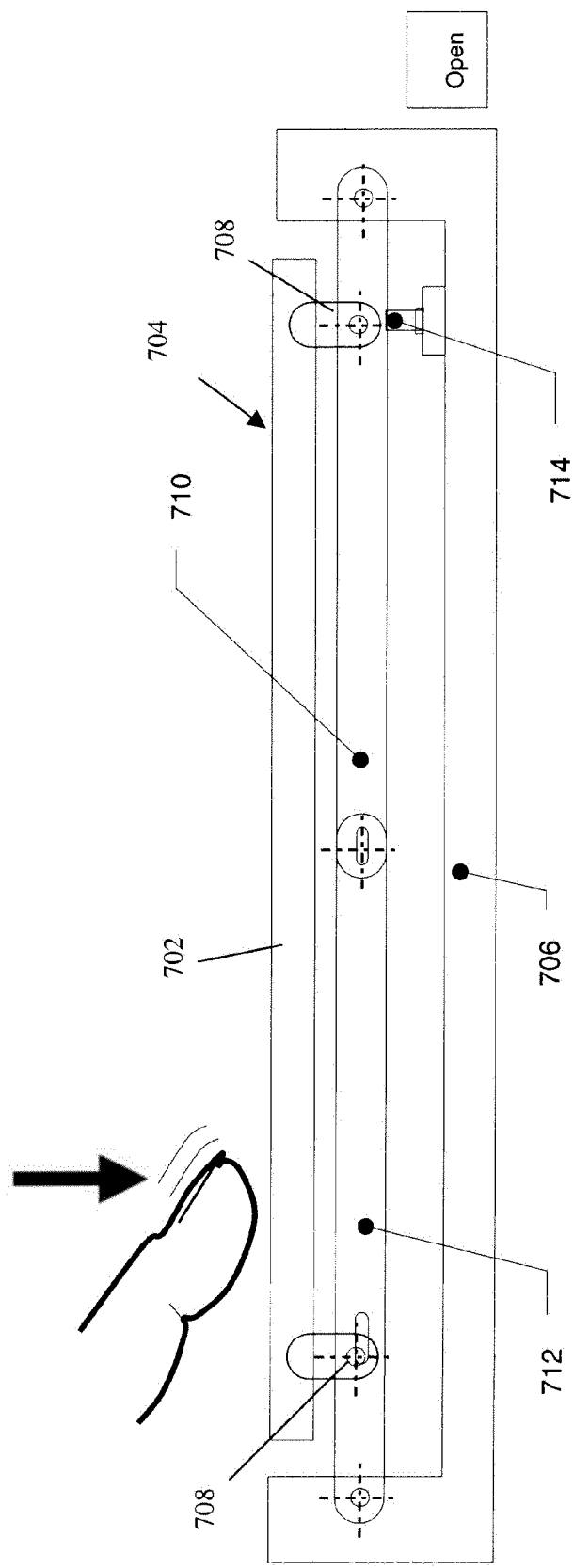
FIGS. 7A-7E are schematic illustrations of exemplary touch pad devices that can be used to practice aspects of the disclosed embodiments.
Figure 7B:
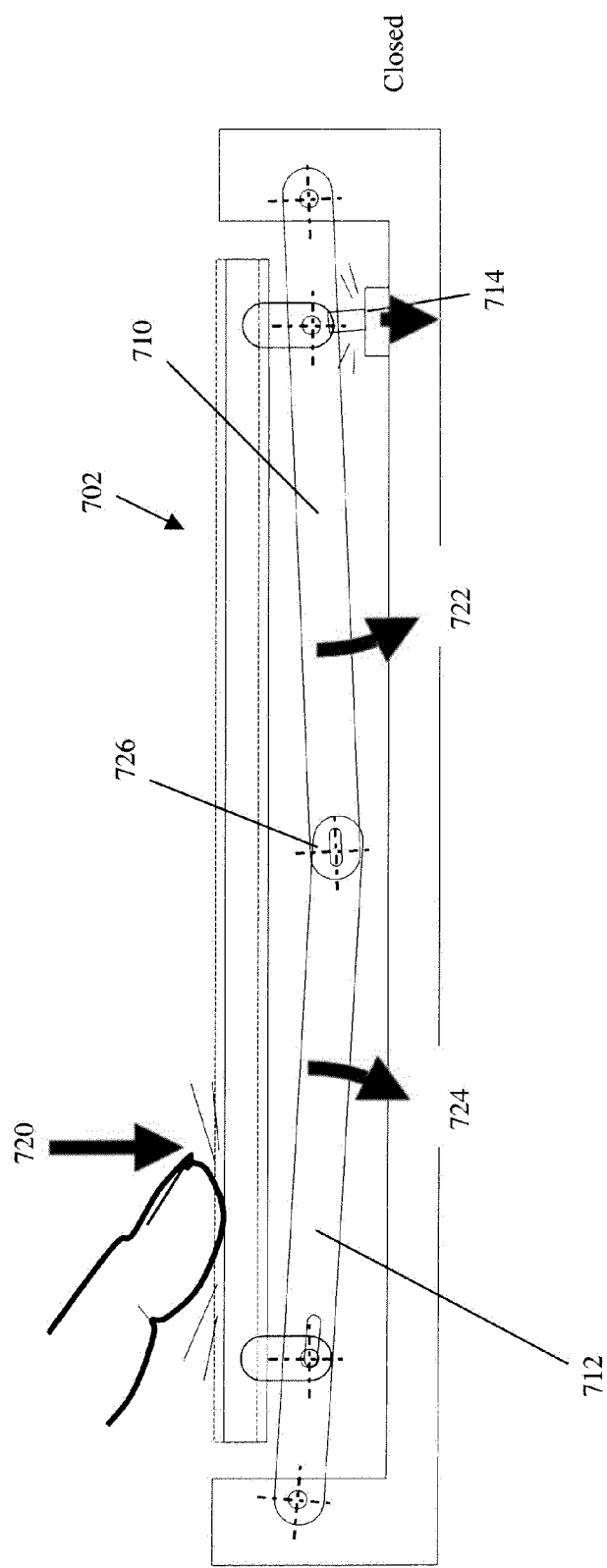
Figure 7C:
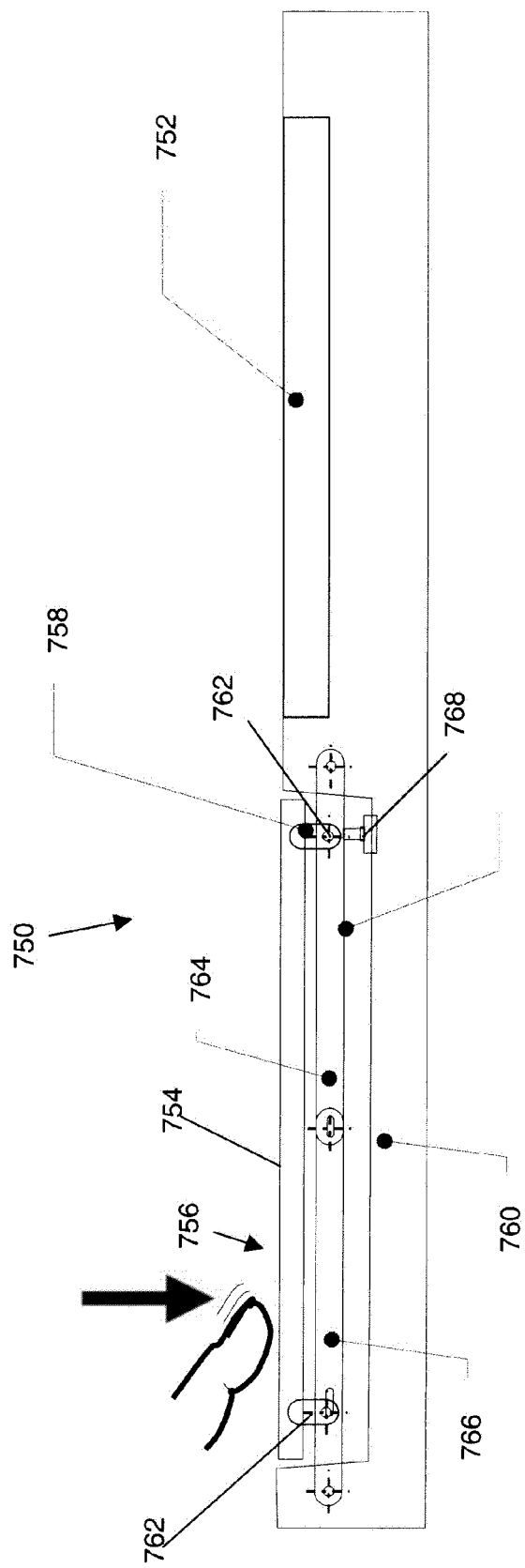

Examples of touch pad and touch-click devices in which aspects of the disclosed embodiments can be practiced are shown in FIGS. 7A-7C. FIG. 7A illustrates an example where the entire display 702 is configured to be a touch pad area, while in FIG. 7C, only the keymat area 752 is configured to be the touch pad area. As shown in FIG. 7A, a display 702 with a frame 704 and exterior body 706 is supported at four places (four feet) 708 connected to two sets of levers, 710, 712, one set in each side. The first lever 710 comprises a main actuator while the second lever 712 comprises a follower. A micro switch actuator 714 can be positioned underneath the main actuator 710 and can be configured to detect movement of the main actuator 710.

In FIG. 7B, a force 720 exerted on the display area 702 causes the entire display to move downward in a parallel movement. This provides a uniform force feedback from the micro switch 714. Each lever 710, 712 generally moves in a respective direction 722, 724, about moment 726.

FIG. 7C illustrates an example where the user interface 750 includes a display 752 and a touch pad area 754. The touch pad area 754 is formed in an area of the user interface 750 that is generally known as the keypad area 756. In this example, the touch pad 754 comprises a frame 758 and exterior body 760. Similar to FIG. 7A, the frame 758 is supported at four places 762 and connected to two sets of levers 764, 766, and includes a micro switch 768. In one embodiment, the total thickness of the design is comparable with conventional keymats.

The touch pad of FIG. 7C can enhance navigation as the display screen always appears at full view. The screen is not blocked by the pointing device, such as the user's fingers. Travel distance of the pointing device can be reduced and multi-toggling with cursors in lists can be faster and easier.

Figure 7D:
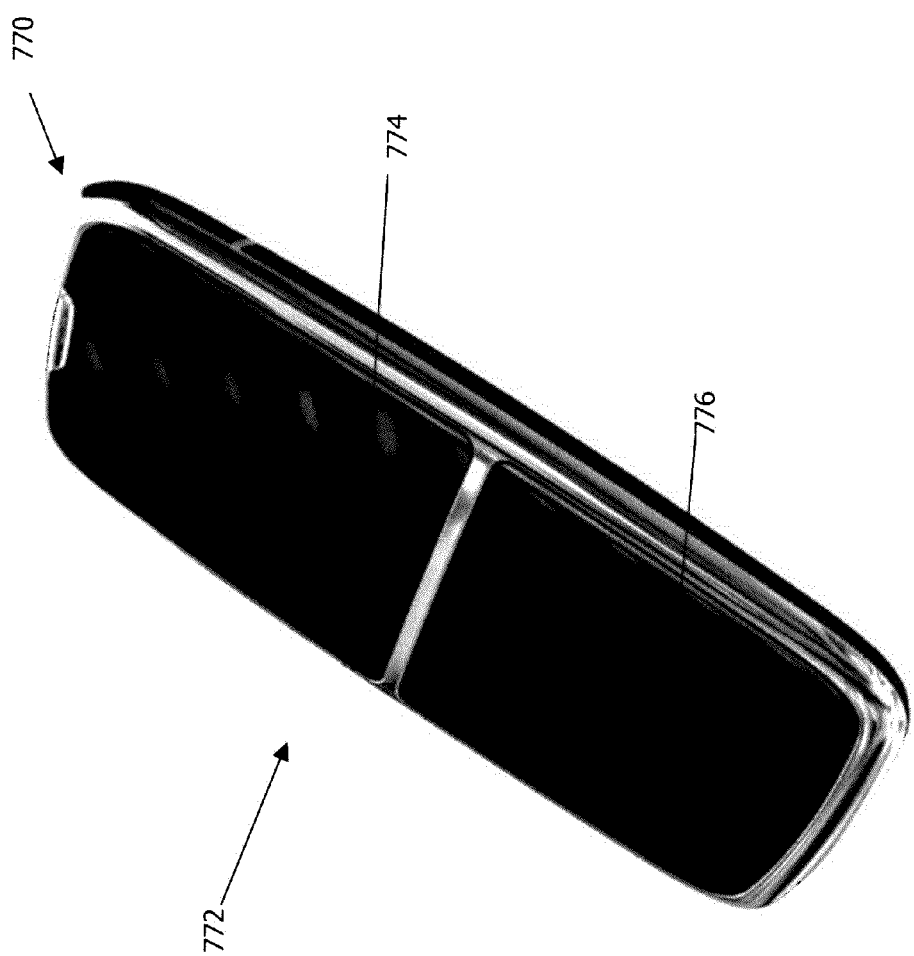

In one embodiment, referring to FIG. 7D, when the device 770 is in an off/idle mode, the entire display surface 772, also referred to as the user interface, can be generally smooth and can present as blank or with a darkened appearance. In this example, there is no immediate visible distinction between the display area 774 and a keypad area 776, as those areas are described herein. Both areas appear generally similar. In an alternate embodiment, the front surface area 772, when in the off/idle mode can present in any desired appearance, other than including a darkened presentation. For example, when the device 770 is in an off/idle mode or state, the front surface area 772 can have a colored appearance, or an off/idle image can be presented on one or both of the areas 774 and 776.

Figure 7E:
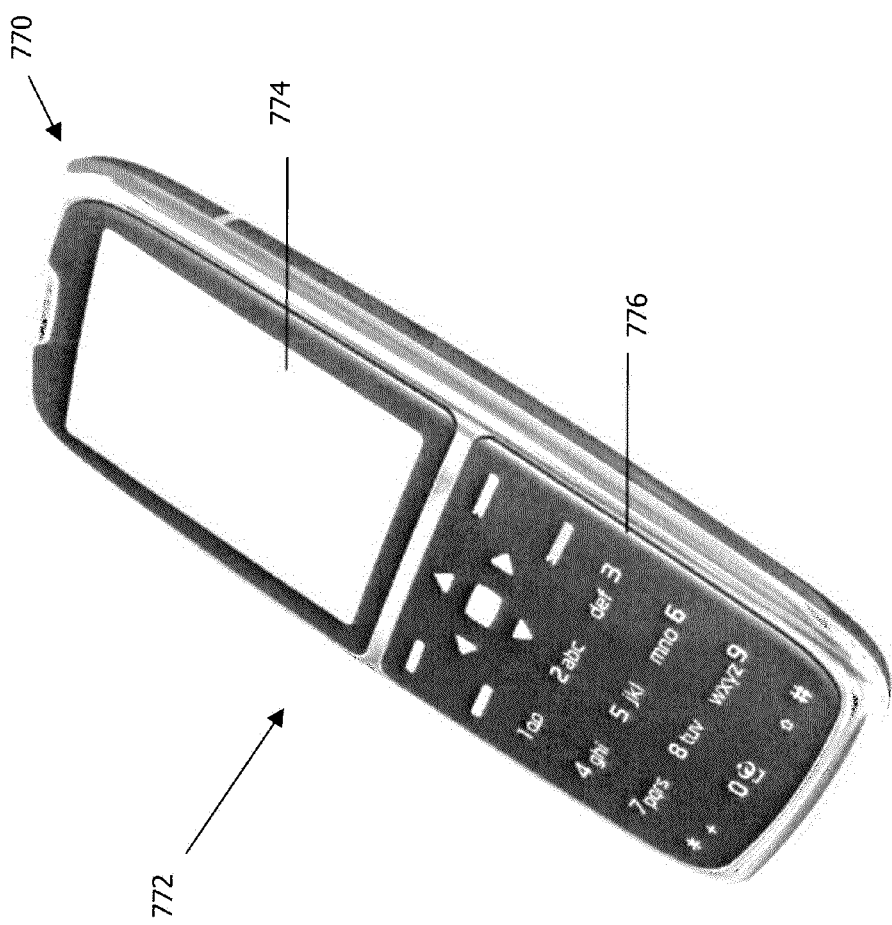

When the device 770 is activated, the front surface 772 of the device can illuminate or light up, using for example, backlit technologies, to present an active view mode or state. As shown in FIG. 7E, when the device 770 is active, the display screen 774 and the keypad display 776 appear in respective areas. In alternate embodiments, any suitable or desired image(s) or screen views can be presented in the active mode of the device 770. In one embodiment, the keypad or keymat area 776 is a single glass surface. As described herein, the keypad area 776, which in one embodiment comprises a touch sensitive area, or touchpad, can accept gestures for shortcuts and scrolling or letter writing. In one embodiment, a single image or view can be presented across an expanse of both of the display screen 774 and the keypad display 776 to appear as a full screen view.

Figure 4B:
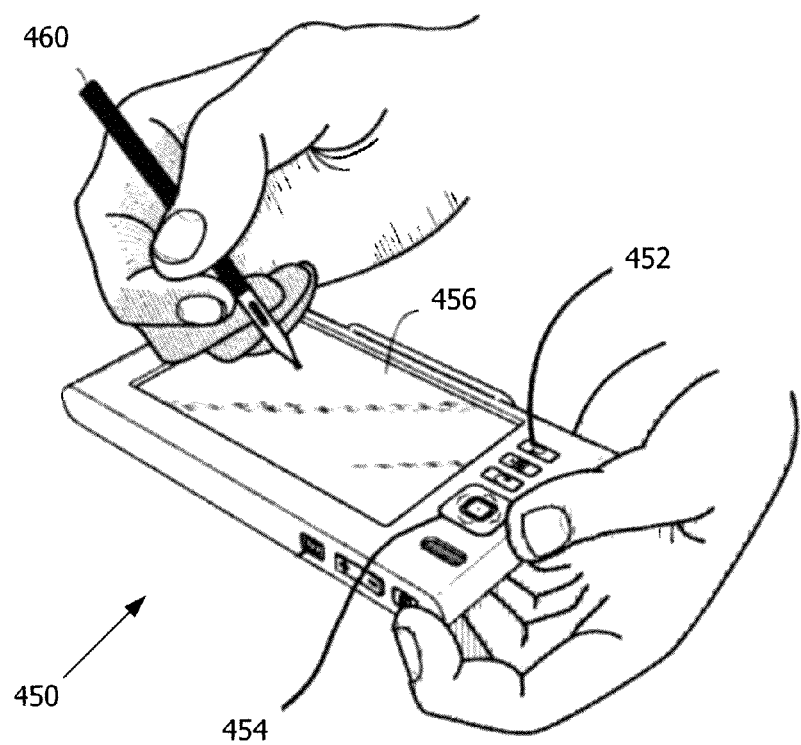

Some examples of devices on which aspects of the disclosed embodiments can be practiced are illustrated with respect to FIGS. 4A-4B. The devices are merely exemplary and are not intended to encompass all possible devices or all aspects of devices on which the disclosed embodiments can be practiced. The aspects of the disclosed embodiments can rely on very basic capabilities of devices and their user interface. Buttons or key inputs can be used for selecting the various selection criteria and links, and a scroll function can be used to move to and select item(s).

FIG. 4A illustrates one example of a device 400 that can be used to practice aspects of the disclosed embodiments. As shown in FIG. 4A, in one embodiment, the device 400 has a display area 402 and a touch sensitive area 404. The touch sensitive area 404 can include keypad 406 as an input device. The keypad 406, in the form of soft keys, may include any suitable user input functions such as, for example, a multi-function/scroll key 410, soft keys 410, 412, call key 414, end key 416 and alphanumeric keys 418. In one embodiment, referring to FIG. 4C, the touch screen area 484 of device 480 can also present secondary functions, other than a keypad, using changing graphics.

In one embodiment, the device 400 can include an image capture device such as a camera (not shown) as a further input device. The display 402 may be any suitable display, and can also include a touch screen display or graphical user interface. The display may be integral to the device 400 or the display may be a peripheral display connected or coupled to the device 400. A pointing device, such as for example, a stylus, pen or simply the user's finger may be used in conjunction with the touch sensitive area 404 for cursor movement, menu selection, gestures and other input and commands. In alternate embodiments any suitable pointing or touch device, or other navigation control may be used. In other alternate embodiments, the display may be a conventional display. The device 400 may also include other suitable features such as, for example a loud speaker, tactile feedback devices or connectivity port. The mobile communications device may have a processor 418 connected or coupled to the display for processing user inputs and displaying information on the display 402 and touch sensitive area 404. A memory 420 may be connected to the processor 418 for storing any suitable information, data, settings and/or applications associated with the mobile communications device 400.

Although the above embodiments are described as being implemented on and with a mobile communication device, it will be understood that the disclosed embodiments can be practiced on any suitable device incorporating a processor, memory and supporting software or hardware. For example, the disclosed embodiments can be implemented on various types of music, gaming and multimedia devices. In one embodiment, the system 100 of FIG. 1 may be for example, a personal digital assistant (PDA) style device 450 illustrated in FIG. 4B. The personal digital assistant 450 may have a keypad 452, cursor control 454, a touch screen display 456, and a pointing device 460 for use on the touch screen display 456. In still other alternate embodiments, the device may be a personal computer, a tablet computer, touch pad device, Internet tablet, a laptop or desktop computer, a mobile terminal, a cellular/mobile phone, a multimedia device, a personal communicator, a television set top box, a digital video/versatile disk (DVD) or high definition player or any other suitable device capable of containing for example a display 114 shown in FIG. 1, and supported electronics such as the processor 418 and memory 420 of FIG. 4A. In one embodiment, these devices will be Internet enabled and include GPS and map capabilities and functions.

Figure 5:
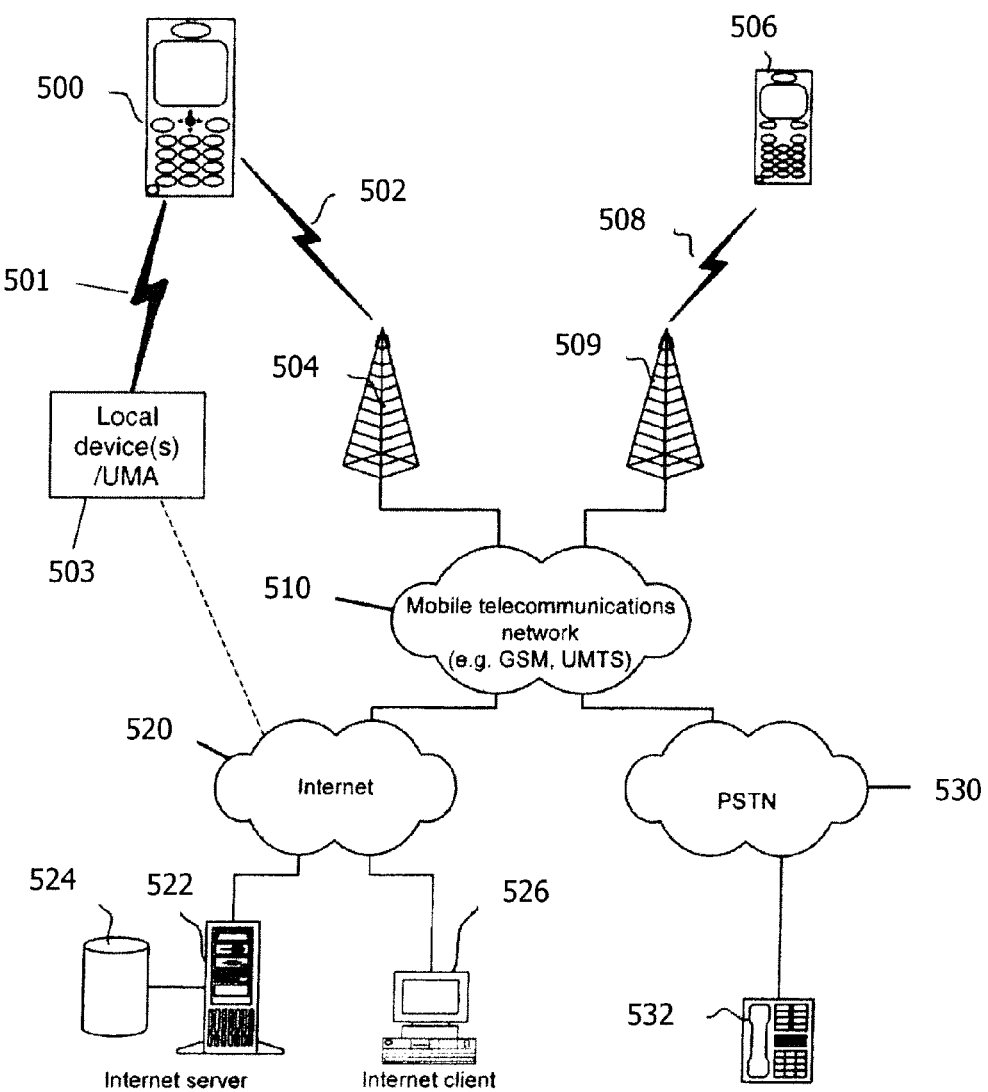
FIG. 5 illustrates a block diagram of an exemplary system incorporating features that may be used to practice aspects of the disclosed embodiments.

In the embodiment where the device 400 comprises a mobile communications device, the device can be adapted for communication in a telecommunication system, such as that shown in FIG. 5. In such a system, various telecommunications services such as cellular voice calls, worldwide web/wireless application protocol (www/wap) browsing, cellular video calls, data calls, facsimile transmissions, data transmissions, music transmissions, multimedia transmissions, still image transmission, video transmissions, electronic message transmissions and electronic commerce may be performed between the mobile terminal 500 and other devices, such as another mobile terminal 506, a line telephone 532, a personal computer (Internet client) 526 and/or an internet server 522.

It is to be noted that for different embodiments of the mobile device or terminal 500, and in different situations, some of the telecommunications services indicated above may or may not be available. The aspects of the disclosed embodiments are not limited to any particular set of services or communication, protocol or language in this respect.

The mobile terminals 500, 506 may be connected to a mobile telecommunications network 510 through radio frequency (RF) links 502, 508 via base stations 504, 509. The mobile telecommunications network 510 may be in compliance with any commercially available mobile telecommunications standard such as for example the global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 510 may be operatively connected to a wide-area network 520, which may be the Internet or a part thereof. An Internet server 522 has data storage 524 and is connected to the wide area network 520. The server 522 may host a worldwide web/wireless application protocol server capable of serving worldwide web/wireless application protocol content to the mobile terminal 500. The mobile terminal 500 can also be coupled to the Internet 520. In one embodiment, the mobile terminal 500 can be coupled to the Internet 520 via a wired or wireless link, such as a Universal Serial Bus (USB) or Bluetooth™ connection, for example.

A public switched telephone network (PSTN) 530 may be connected to the mobile telecommunications network 510 in a familiar manner. Various telephone terminals, including the stationary telephone 532, may be connected to the public switched telephone network 530.

The mobile terminal 500 is also capable of communicating locally via a local link 501 to one or more local devices 503. The local links 501 may be any suitable type of link or piconet with a limited range, such as for example Bluetooth™, a USB link, a wireless Universal Serial Bus (WUSB) link, an IEEE 802.11 wireless local area network (WLAN) link, an RS-232 serial link, etc. The local devices 503 can, for example, be various sensors that can communicate measurement values or other signals to the mobile terminal 500 over the local link 501. The above examples are not intended to be limiting, and any suitable type of link or short range communication protocol may be utilized. The local devices 503 may be antennas and supporting equipment forming a wireless local area network implementing Worldwide Interoperability for Microwave Access (WiMAX, IEEE 802.16), WiFi (IEEE 802.11x) or other communication protocols. The wireless local area network may be connected to the Internet. The mobile terminal 500 may thus have multi-radio capability for connecting wirelessly using mobile communications network 510, wireless local area network or both. Communication with the mobile telecommunications network 510 may also be implemented using WiFi, Worldwide Interoperability for Microwave Access, or any other suitable protocols, and such communication may utilize unlicensed portions of the radio spectrum (e.g. unlicensed mobile access (UMA)). In one embodiment, the navigation module 122 of FIG. 1 includes communication module 134 that is configured to interact with, and communicate with, the system described with respect to FIG. 5.

Figure 6:
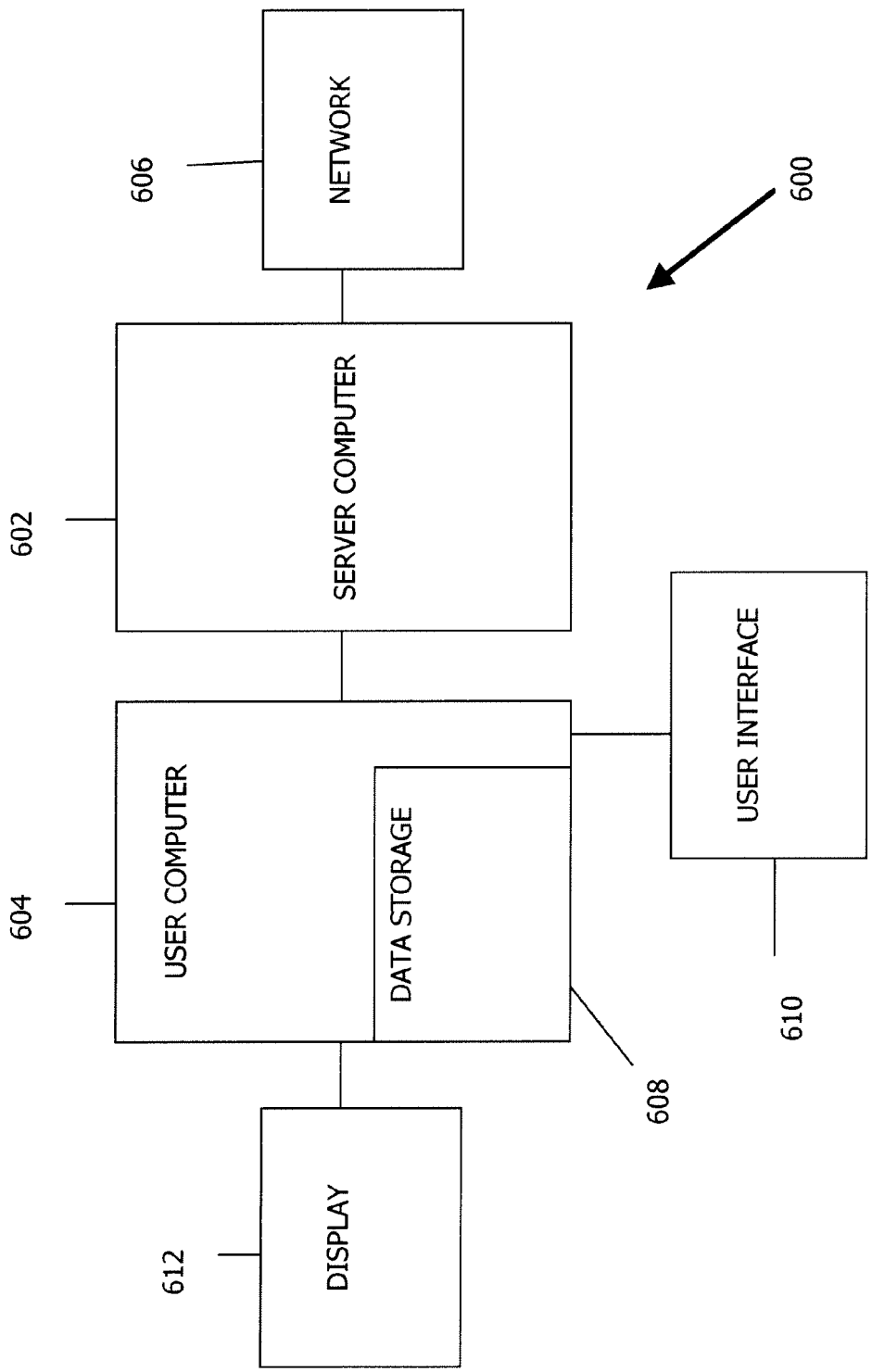
FIG. 6 is a block diagram illustrating the general architecture of an exemplary system in which the devices of FIGS. 4A and 4B may be used.

The disclosed embodiments may also include software and computer programs incorporating the process steps and instructions described above. In one embodiment, the programs incorporating the process steps described herein can be executed in one or more computers. FIG. 6 is a block diagram of one embodiment of a typical apparatus 600 incorporating features that may be used to practice aspects of the invention. The apparatus 600 can include computer readable program code means for carrying out and executing the process steps described herein. In one embodiment the computer readable program code is stored in a memory of the device. In alternate embodiments the computer readable program code can be stored in memory or memory medium that is external to, or remote from, the apparatus 600. The memory can be direct coupled or wireless coupled to the apparatus 600. As shown, a computer system 602 may be linked to another computer system 604, such that the computers 602 and 604 are capable of sending information to each other and receiving information from each other. In one embodiment, computer system 602 could include a server computer adapted to communicate with a network 606. Alternatively, where only one computer system is used, such as computer 604, computer 604 will be configured to communicate with and interact with the network 606. Computer systems 602 and 604 can be linked together in any conventional manner including, for example, a modem, wireless, hard wire connection, or fiber optic link. Generally, information can be made available to both computer systems 602 and 604 using a communication protocol typically sent over a communication channel or other suitable connection or line, communication channel or link. In one embodiment, the communication channel comprises a suitable broad-band communication channel. Computers 602 and 604 are generally adapted to utilize program storage devices embodying machine-readable program source code, which is adapted to cause the computers 602 and 604 to perform the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

Computer systems 602 and 604 may also include a microprocessor for executing stored programs. Computer 602 may include a data storage device 608 on its program storage device for the storage of information and data. The computer program or software incorporating the processes and method steps incorporating aspects of the disclosed embodiments may be stored in one or more computers 602 and 604 on an otherwise conventional program storage device. In one embodiment, computers 602 and 604 may include a user interface 610, and/or a display interface 612 from which aspects of the invention can be accessed. The user interface 610 and the display interface 612, which in one embodiment can comprise a single interface, can be adapted to allow the input of queries and commands to the system, as well as present the results of the commands and queries, as described with reference to FIG. 1, for example.

The aspects of the disclosed embodiments provide for activating and enabling a zoom function of a device without the need for using menu keys, dedicated keys or menu navigation to activate the function. Gesture movements on a touch sensitive area of a device are detected and interpreted. If an image is being displayed, certain gesture movements are used to activate the zoom function and input commands to utilize the zoom functionality. The touch sensitive area can also function as a keypad when gesture movements are not detected.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
   causing a touch sensitive keypad area providing associated keypad functionality to be presented on a touch sensitive area of a device;
   determining whether an image is being presented on a display area of the device;
   detecting a pointing device input on the touch sensitive area of the device;
   determining whether the input includes at least one point of contact on the touch sensitive keypad area;
   determining whether the input corresponds to a keypad input; and
   in an instance in which it is determined that an image is being presented on the display area of the device, that the input includes at least one point of contact on the touch sensitive keypad area, and that the input does not correspond to a keypad input:
   activating a zoom functionality of the device.

2. The method of claim 1 further comprising detecting movement of the pointing device on the touch sensitive area and wherein a movement in a first direction activates a zoom out function with respect to an image presented on a display of the device and a movement in a second direction activates a zoom in function with respect to the image presented on the display of the device.

3. The method of claim 1 further comprising deactivating the zooming function when the pointing device is released from the touch sensitive area.

4. The method of claim 1 further comprising determining whether the input comprises two substantially simultaneous points of contact on the touch sensitive area, wherein activating the zoom functionality comprises activating the zoom functionality in an instance in which the input comprises two substantially simultaneous points of contact on the touch sensitive area.

5. The method of claim 4 further comprising that the two substantially simultaneous points of contact on the touch sensitive area are two fingers of a user.

6. The method of claim 4 further comprising detecting a movement of the two substantially simultaneous points of contact on the touch sensitive area, wherein a movement in a first direction activates a zoom out function with respect to an image presented on a display of the device and a movement in a second direction activates a zoom in function with respect to the image presented on the display of the device.

7. The method of claim 4 further comprising detecting that the two substantially simultaneous points of contact on the touch sensitive area are released and deactivating the zooming function of the device.

8. The method of claim 1 further comprising causing the keypad area and associated keypad functionality to be removed and deactivated from the touch sensitive area of the display in an instance in which it is determined that an image is being presented on the display area of the device, that the input includes at least one point of contact on the touch sensitive keypad area, and that the input does not correspond to a keypad input.

9. The method of claim 8 further comprising causing the keypad area to be re-presented and re-activated on the touch sensitive area of the display when the pointing device is removed from the touch sensitive area for at least a pre-determined period of time.

10. The method of claim 1 wherein the display area is separate from the touch sensitive area.

11. The method of claim 1 further comprising that the detected contact is a short press or a press and hold of the pointing device for a pre-determined period.

12. The method of claim 1 further comprising providing a notification when the zoom function is activated.

13. An apparatus comprising a processor and a memory storing computer program code portions, the computer program code portions being configured to, upon execution, cause the apparatus to at least:
   cause a touch sensitive keypad area providing associated keypad functionality to be presented on a touch sensitive area of a device;
   determine whether an image is being presented on a display area of a device;
   detect a pointing device input on the touch sensitive area of the device;
   determine whether the input includes at least one point of contact on the touch sensitive keypad area;
   determine whether the input corresponds to a keypad input; and
   in an instance in which it is determined that an image is being presented on the display area of the device, that the input includes at least one point of contact on the touch sensitive keypad area, and that the input does not correspond to a keypad input:
   activate a zoom functionality of the device.

14. The apparatus of claim 13 wherein the program code portions are further configured to, upon execution, cause the apparatus to detect movement of the pointing device on the touch sensitive area and wherein a movement in a first direction activates a zoom out function with respect to an image presented on a display of the device and a movement in a second direction activates a zoom in function with respect to the image presented on the display of the device.

15. The apparatus of claim 13 wherein the program code portions are further configured to, upon execution, cause the apparatus to deactivate the zooming function when the pointing device is released from the touch sensitive area.

16. The apparatus of claim 13 wherein the program code portions are further configured to, upon execution, cause the apparatus to: determine whether the input comprises two substantially simultaneous points of contact on the touch sensitive area, and activate the zoom functionality in an instance in which the input comprises two substantially simultaneous points of contact on the touch sensitive area.

17. The apparatus of claim 13 wherein the program code portions are further configured to, upon execution, cause the apparatus to cause the keypad area and associated keypad functionality to be removed and deactivated from the touch sensitive area of the display in an instance in which it is determined that an image is being presented on the display area of the device, that the input includes at least one point of contact on the touch sensitive keypad area, and that the input does not correspond to a keypad input.

18. The apparatus of claim 17 wherein the program code portions are further configured to, upon execution, cause the apparatus to cause the keypad view and functionality to be re-presented and re-activated on the touch sensitive area of the display when the pointing device is removed from the touch sensitive area for at least a pre-determined period of time.

19. The apparatus of claim 13 further comprising that the display area of the apparatus is separate from the touch sensitive area.

20. A computer program product comprising a non-transitory computer readable storage medium storing computer program code portions therein, the computer program code portions being configured to, upon execution in a processor, cause an apparatus to at least:

cause a touch sensitive keypad area providing associated keypad functionality to be presented on a touch sensitive area of a device;

determine whether an image is being presented on a display area of the device;

detect a pointing device input on the touch sensitive area of the device;

determine whether the input includes at least one point of contact on the touch sensitive keypad area;

determine whether the input corresponds to a keypad input; and in an instance in which it is determined that an image is being presented on the display area of the device, that the input includes at least one point of contact on the touch sensitive keypad area, and that the input does not correspond to a keypad input:

activate a zoom functionality of the device.

* * * * *